United States Patent
Kim et al.

(10) Patent No.: US 12,009,873 B2
(45) Date of Patent: Jun. 11, 2024

(54) METHOD OF RECOGNIZING IMMERSION AND ELECTRONIC DEVICE FOR PERFORMING THE SAME

(71) Applicant: SAMSUNG ELECTRONICS CO., LTD., Suwon-si (KR)

(72) Inventors: Hoyeon Kim, Suwon-si (KR); Jeongsik Kim, Suwon-si (KR); Eunsoo Park, Suwon-si (KR); Hyuntae Jung, Suwon-si (KR); Jinwan An, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 18/085,582

(22) Filed: Dec. 21, 2022

(65) Prior Publication Data

US 2023/0147727 A1    May 11, 2023

Related U.S. Application Data

(63) Continuation of application No. PCT/KR2022/017105, filed on Nov. 3, 2022.

(30) Foreign Application Priority Data

Nov. 11, 2021  (KR) .......................... 10-2021-0155059
Dec. 1, 2021   (KR) .......................... 10-2021-0169748

(51) Int. Cl.
*H04B 17/15*    (2015.01)
*H04B 17/345*   (2015.01)
*H04M 1/18*     (2006.01)

(52) U.S. Cl.
CPC ........... *H04B 17/15* (2015.01); *H04B 17/345* (2015.01); *H04M 1/18* (2013.01)

(58) Field of Classification Search
CPC ..................................................... H04B 17/15
See application file for complete search history.

(56) References Cited

U.S. PATENT DOCUMENTS 8,773,271 B1   7/2014  Stevens et al.
10,509,002 B2  12/2019 Jesme et al.
(Continued)

FOREIGN PATENT DOCUMENTS

KR   10-0926213 B1    11/2009
KR   1020160063068 A   6/2016
(Continued)

OTHER PUBLICATIONS

International Search Report dated Feb. 15, 2023 for PCT/KR2022/017105, citing the above reference(s). In conformance with MPEP 609—Concise explanation of the relevance includes issue date of foreign OA and references cited therein.

*Primary Examiner* — Hsinchun Liao
(74) *Attorney, Agent, or Firm* — CANTOR COLBURN LLP

(57) ABSTRACT

An electronic device includes an antenna which transmits and receives a radio frequency (RF) signal, an RF circuit which processes the RF signal, and a control circuit which controls the RF circuit. The control circuit receives, from the RF circuit, a feedback signal, which the RF signal to be provided back as feedback from the antenna to the RF circuit, determines an impedance of the antenna based on the feedback signal, determines whether a water immersion of the electronic device occurs based on the determined impedance, and performs a set operation once it is determined that the water immersion of the electronic device occurs.

15 Claims, 14 Drawing Sheets

(56) References Cited

U.S. PATENT DOCUMENTS

| | | | |
|---|---|---|---|
| 2016/0077029 A1* | 3/2016 | Dempster | G01N 22/04 324/694 |
| 2017/0201618 A1 | 7/2017 | Schmidt | |
| 2020/0018726 A1 | 1/2020 | Phan Le et al. | |

FOREIGN PATENT DOCUMENTS

| KR | 1020160137240 A | 11/2016 |
|---|---|---|
| KR | 10-2019-0113501 A | 10/2019 |
| KR | 10-2020-0045124 A | 5/2020 |
| KR | 102317692 B1 | 10/2021 |

* cited by examiner

METHOD OF RECOGNIZING IMMERSION AND ELECTRONIC DEVICE FOR PERFORMING THE SAME

CROSS-REFERENCE TO RELATED APPLICATIONS

This application is a PCT-Bypass of International Application No. PCT/KR2022/017105 designating the United States, filed on Nov. 3, 2022, which claims priority to Korean Patent Application No. 10-2021-0155059, filed on Nov. 11, 2021, in the Korean Intellectual Property Office, and Korean Patent Application No. 10-2021-0169748, filed on Dec. 1, 2021, in the Korean Intellectual Property Office, the contents of which in their entireties are herein incorporated by reference.

BACKGROUND

1. Field

The disclosure relates to a method of recognizing an immersion of an electronic device in water.

2. Description of Related Art

Recently, an electronic device, such as a portable terminal device, may support a waterproof function to improve usability. In an electronic device that supports a waterproof function, for example, internal components of the electronic device, vulnerable to moisture, may be protected using waterproof tape for protection.

Recent development of display technology enables a user to use a foldable or bendable terminal device having a waterproof function, in addition to a bar-type terminal device.

SUMMARY

A waterproof structure of a foldable electronic device is different from that of a bar-type electronic device. When water penetrates a foldable electronic device although the foldable electronic device has a waterproof function, the antenna performance of the foldable electronic device may be affected. When water penetrates a foldable electronic device, a user may neither recognize the penetration nor understand why antenna performance deteriorates.

According to embodiments, a method of recognizing immersion in water and an electronic device performing the method may recognize the immersion of an electronic device into water once the electronic device immerses in water and notify a user that the electronic device immerses in water so that the user may take action against the immersion.

An electronic device according to embodiments includes an antenna which transmits and receives a radio frequency (RF) signal, an RF circuit which processes the RF signal, and a control circuit which controls the RF circuit, where the control circuit receives, from the RF circuit, a feedback signal, which is the RF signal to be provided back as feedback from the antenna to the RF circuit, determine whether a water immersion of the electronic device occurs based on the feedback signal, determines whether the water immersion of the electronic device occurs based on the determined impedance, and performs a set operation once it is determined that the water immersion of the electronic device occurs.

An electronic device according to embodiments includes a first antenna and a second antenna which transmit and receive an RF signal, an RF circuit which processes the RF signal, and a control circuit which controls the RF circuit, where the control circuit determines whether a water immersion of the electronic device occurs based on whether interference occurs between a first RF signal transmitted and received through the first antenna and a second RF signal transmitted and received through the second antenna, and perform a set operation once it is determined that the water immersion of the electronic device occurs.

A method of recognizing a water immersion and an electronic device for performing the method, according to embodiments, may recognize the water immersion of an electronic device once it is determined that the water immersion of the electronic device occurs and notify a user that the water immersion of the electronic device occurs so that the user may take action to improve a communication function deteriorated by moisture.

BRIEF DESCRIPTION OF THE DRAWINGS

The above and other features of certain embodiments of the disclosure will be more apparent from the following detailed description, taken in conjunction with the accompanying drawings, in which.

DETAILED DESCRIPTION

Figure 1:
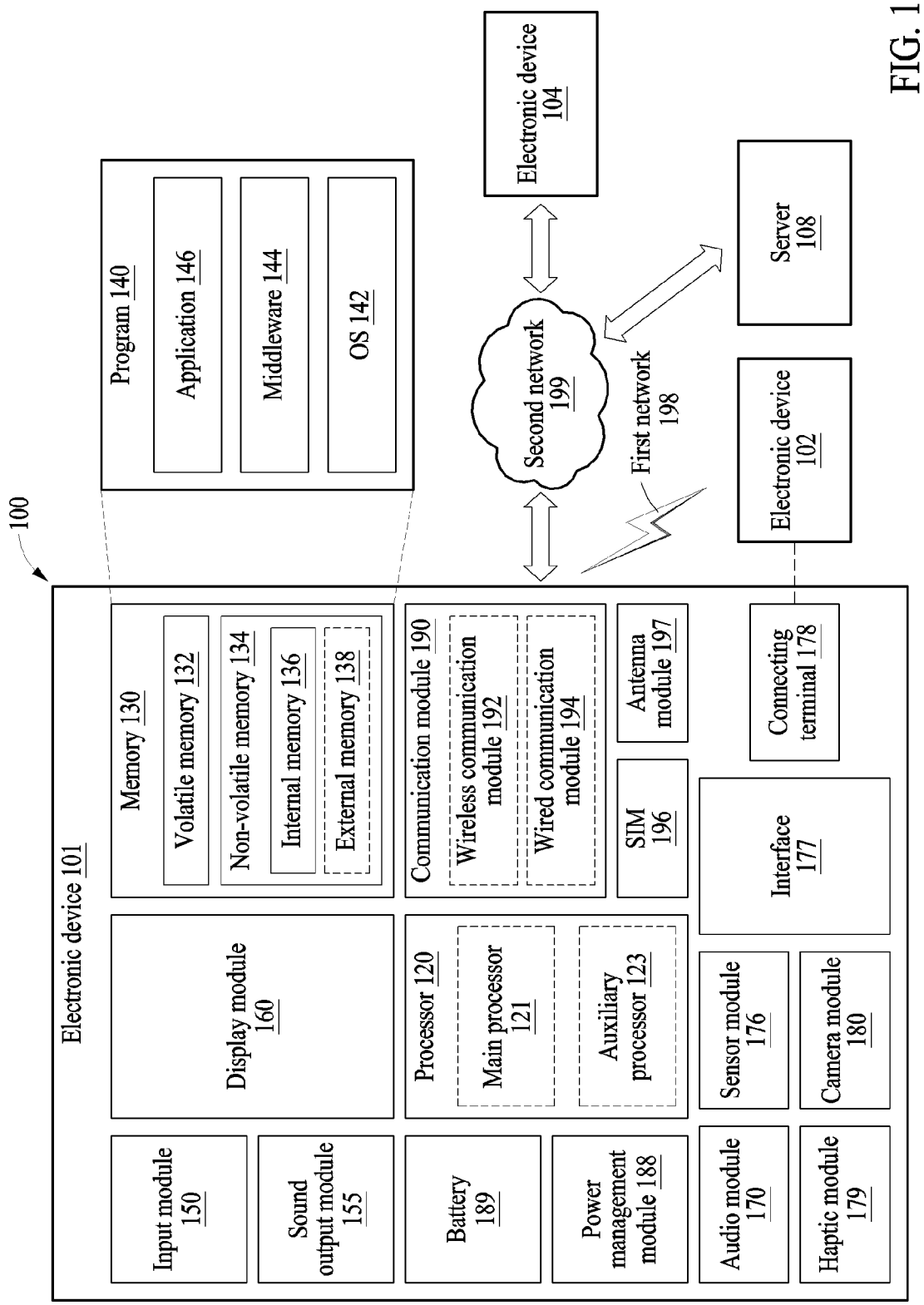
FIG. 1 is a block diagram illustrating an electronic device in a network environment according to one embodiment.

Hereinafter, embodiments will be described in detail with reference to the accompanying drawings. When describing the embodiments with reference to the accompanying drawings, like reference numerals refer to like constituent elements and a repetitive detailed description thereof may be omitted or simplified.

Hereinafter, various embodiments will be described in detail with reference to the accompanying drawings.

FIG. 1 is a block diagram illustrating an electronic device 101 in a network environment 100 according to one embodiment.

Referring to FIG. 1, an embodiment of the electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one selected from the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. In one embodiment, where the electronic device 101 includes the main processor 121 and the auxiliary processor 123, the auxiliary processor 123 may be adapted to consume less power than the main processor 121 or to be predetermined to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) selected from the components of the electronic device 101, instead of the main processor 121 while the main processor 121 is in an inactive (e.g., sleep) state or along with the main processor 121 while the main processor 121 is an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to one embodiment, the display module 160 may include a touch sensor adapted to detect a touch, or a pressure sensor adapted to measure the intensity of force incurred by the touch.

The audio module 170 may convert a sound into an electric signal or vice versa. According to one embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, image signal processors, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such an embodiment, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to one embodiment, the antenna module 197 may form a mmWave antenna module. According to one embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to one embodiment, all or some of operations to be executed by the electronic device 101 may be executed at one or more external electronic devices (e.g., the external devices 102 and 104, and the server 108). For example, in a case where the electronic device 101 is desired to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In one embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
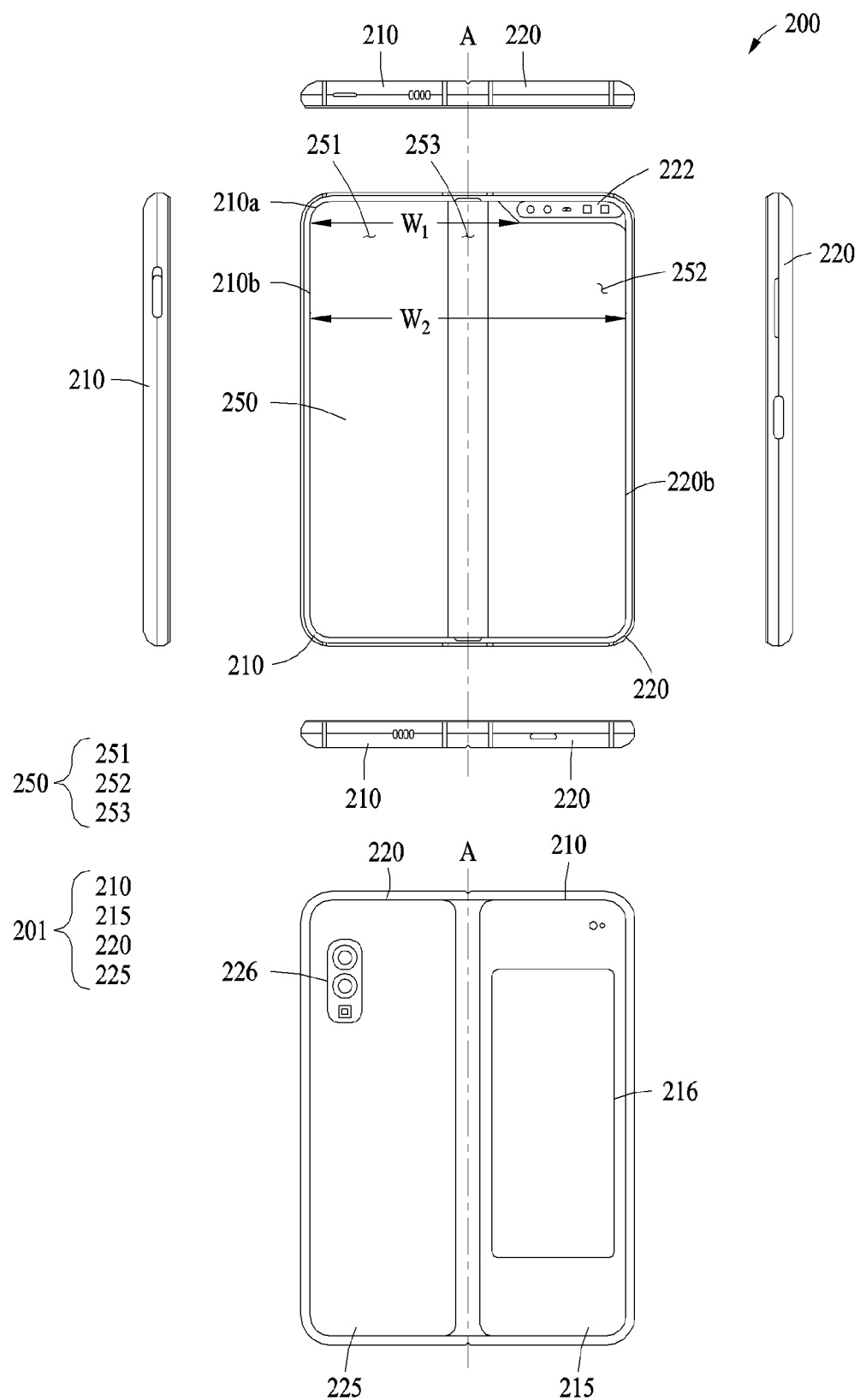
FIG. 2 is a diagram of an electronic device in an unfolded state according to one embodiment.
Figure 3:
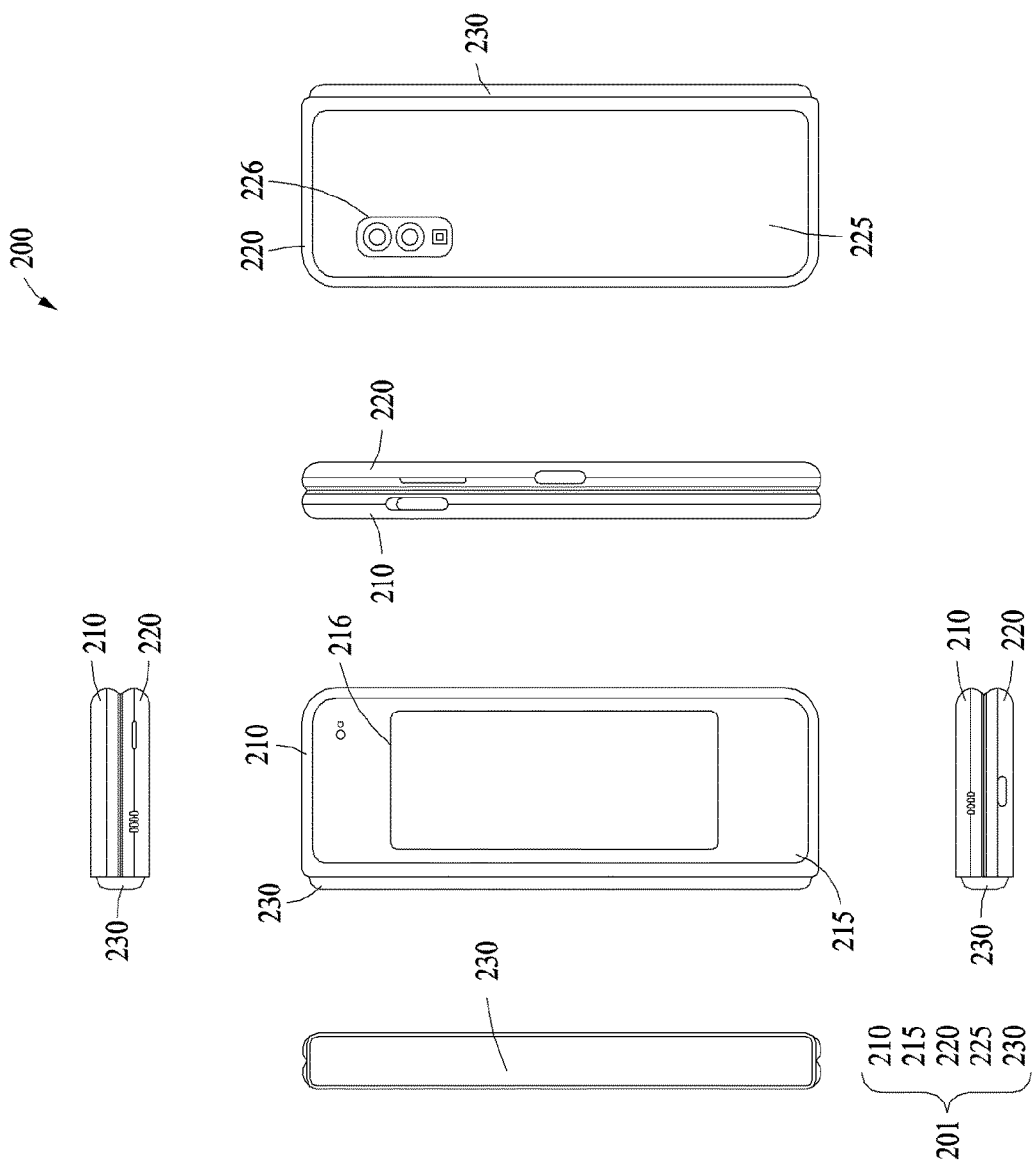
FIG. 3 is a diagram of an electronic device in a folded state according to one embodiment.
Figure 4A:
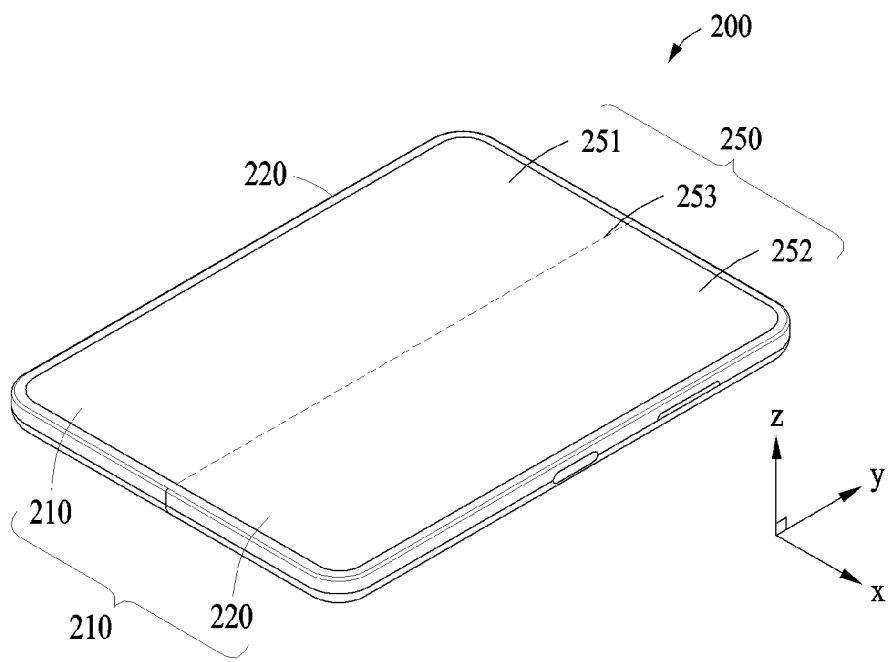
FIGS. 4A and 4B are perspective views of an electronic device in a completely unfolded state or a partially unfolded state (or an intermediate state) according to one embodiment.
Figure 4B:
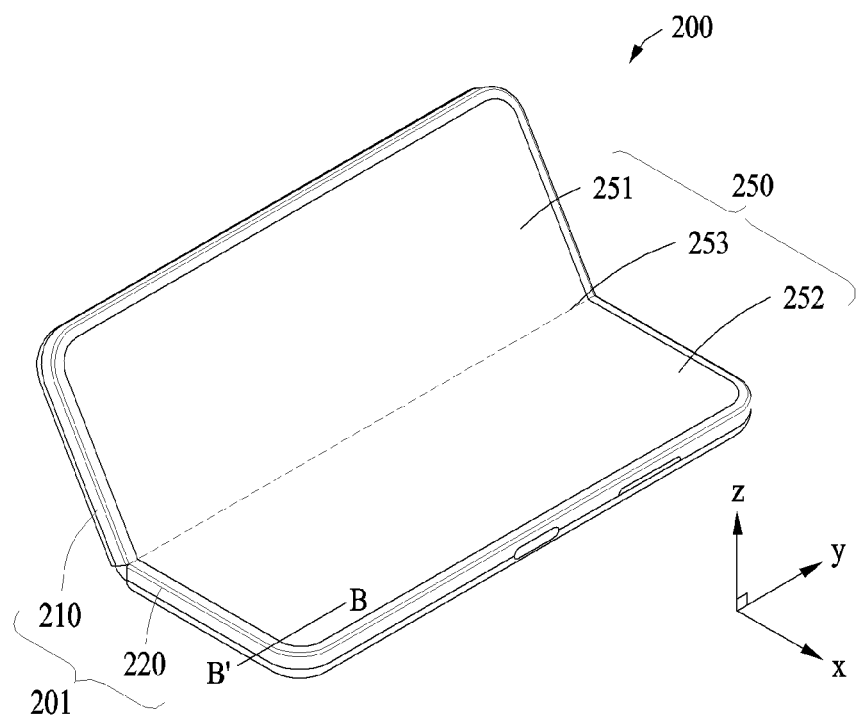

FIG. 2 is a diagram illustrating an electronic device 200 in an unfolded state according to one embodiment. FIG. 3 is a diagram illustrating the electronic device 200 in a folded state according to one embodiment. FIGS. 4A and 4B are perspective views illustrating an example of the electronic device 200 in a completely unfolded state or an intermediate state according to one embodiment.

The electronic device 200 of FIGS. 2 through 4B is an example of the electronic device 101 of FIG. 1 and may be a foldable or bendable electronic device.

In FIGS. 4A and 4B and other following drawings, illustrated is a spatial coordinate system defined by an X axis, a Y axis, and a Z axis that are orthogonal to each other. Here, the X-axis may represent a width direction of an electronic device, the Y-axis may represent a length direction of the electronic device, and the Z-axis may represent a height (or thickness) direction of the electronic device. In the following description, a first direction may indicate a direction parallel to the Z axis.

Referring to FIGS. 2 and 3, according to one embodiment, the electronic device 200 may include a foldable housing 201 and a flexible or foldable display 250 (hereinafter, simply referred to as the "display" 250) (e.g., the display module 160 of FIG. 1) in a space formed by the foldable housing 201. According to one embodiment, a surface on which the display 250 is disposed (or a surface on which the display 250 is viewed from the outside of the electronic device 200) may be defined as the front surface of the electronic device 200. In addition, a surface opposite to the front surface may be defined as the rear surface of the electronic device 200. In addition, a surface surrounding a space between the front surface and the rear surface may be defined as the side surface of the electronic device 200.

According to one embodiment, the foldable housing 201 may include a first housing structure 210, a second housing structure 220 including a sensor area 222, a first rear cover 215, a second rear surface 225, and a hinge structure 230. Here, the hinge structure 230 may include a hinge cover that covers a foldable portion of the foldable housing 201. The foldable housing 201 of the electronic device 200 is not limited to the shape and combination shown in FIGS. 2 and 3 and may be implemented in a different shape or a different combination of components. For example, in one alternative embodiment, the first housing structure 210 and the first rear cover 215 may be integrally formed with each other as a single unitary part and the second housing structure 220 and the second rear cover 225 may be integrally formed with each other as a single unitary part.

According to one embodiment, the first housing structure 210 may be connected to the hinge structure 230 and may include a first surface facing a first direction and a second surface facing a second direction opposite to the first direction. The second housing structure 220 may be connected to the hinge structure 230 and may include a third surface facing a third direction and a fourth surface facing a fourth direction opposite to the third direction. The second housing structure 220 may rotate with respect to the first housing structure 210 about the hinge structure 230. A state of the electronic device 200 may change to a folded state or an unfolded state.

According to one embodiment, the first surface may face the third surface in a state in which the electronic device 200 is completely folded and the third direction may be identical to the first direction in a state in which the electronic device 200 is completely unfolded.

According to one embodiment, the first housing structure 210 and the second housing structure 220 are on both sides with a folding axis A at the center and may be symmetrical with respect to the folding axis A. As to be described hereinafter, an angle or distance between the first housing structure 210 and the second housing structure 220 may vary depending on a state of the electronic device 200: an unfolded state, a folded state, or an intermediate state. According to one embodiment, the second housing structure 220 may additionally include the sensor area 222, in which there are various sensors. However, the first housing structure 210 and the second housing structure 220 may have shapes symmetrical to each other in areas other than the sensor area 222.

According to one embodiment, as shown in FIG. 2, the first housing structure 210 and the second housing structure 220 may together form a recess for accommodating the display 250. In one embodiment, due to the sensor area 222, the recess may have at least two different widths in a direction perpendicular to the folding axis A. For example, the recess may have a first width $W_1$ between a first portion 210a of the first housing structure 210 parallel to the folding axis A and a first portion 220a of the second housing structure 220 formed on a periphery of the sensor area 222 and a second width $W_2$ formed by a second portion 210b of the first housing structure 210 and a second portion 220b of the second housing structure 220 not corresponding to the sensor area 222 and parallel to the folding axis A. In this case, the second width $W_2$ may be greater than the first width $W_1$. In one embodiment, the first portion 220a and the second portion 220b of the second housing structure 220 may be at different distances from the folding axis A. The widths of the recess are not limited to the shown example. In one embodiment, the recess may have a plurality of widths due to the shape of the sensor area 222 or asymmetrical portions of the first housing structure 210 and the second housing structure 220. According to one embodiment, the sensor area 222 may be formed to have a predetermined area adjacent to one corner of the second housing structure 220. However, the arrangement, shape, and size of the sensor area 222 are not limited to the shown example. For example, in one alternative embodiment, the sensor area 222 may be provided at another corner of the second housing structure 220 or in an arbitrary area between the upper corner and the lower corner of the second housing structure 220. In one embodiment, components embedded in the electronic device 200 to perform various functions may be exposed in the front surface of the electronic device 200 through the sensor area 222 or through one or more openings provided in the sensor area 222. In one embodiment, the components may include various types of sensors. The sensors may include, for example, at least one selected from a front camera, a receiver, and a proximity sensor. According to one embodiment, the sensor area 222 may not be included in the second housing structure 220 or may be formed at a position different from that shown in the drawings.

According to one embodiment, at least a portion of the first housing structure 210 and the second housing structure 220 may include or be formed of a metal material or a non-metal material having a selected magnitude of rigidity to support the display 250. At least a portion including or formed of the metal material may provide a ground plane to the electronic device 200 and may be electrically connected to a ground line formed on a PCB inside the foldable housing 201.

According to one embodiment, the first rear cover 215 may be on one side of the folding axis A on the rear surface of the electronic device 200 and may have, for example, a substantially rectangular periphery that may be surrounded by the first housing structure 210. In such an embodiment, the second rear cover 225 may be on the other side of the folding axis A on the rear surface of the electronic device 200 and may have a periphery that may be surrounded by the second housing structure 220.

According to one embodiment, the first rear cover 215 and the second rear cover 225 may be substantially symmetrical with respect to the folding axis A, but not being limited thereto. In one alternative embodiment, the electronic device 200 may include a first rear cover 215 and a second rear cover 225 in various shapes. In one embodiment, the first rear cover 215 may be integrally formed with the first housing structure 210 as a single unitary part, and the second rear cover 225 may be integrally formed with the second housing structure 220 as a single unitary part.

According to one embodiment, the first rear cover 215, the second rear cover 225, the first housing structure 210, and the second housing structure 220 may define or form a space in which various components (e.g., a PCB, or a battery) of the electronic device 200 are to be disposed. In one embodiment, one or more components may be on or visually exposed on the rear surface of the electronic device 200. For example, at least a portion of a sub-display may be visually exposed through a first rear area 216 of the first rear cover 215. In one embodiment, one or more components or sensors may be visually exposed through a second rear area 226 of the second rear cover 225. In one embodiment, the sensors may include a proximity sensor and/or a rear camera.

According to one embodiment, a front camera exposed in the front surface of the electronic device 200 through one or more openings defined or provided in the sensor area 222, or a rear camera exposed through the second rear area 226 of the second rear cover 225 may include one or more lenses, an image sensor, and/or an image signal processor. A flash may include, for example, a light-emitting diode (LED) or a xenon lamp. In an embodiment, two or more lenses (IR cameras and wide angle and telephoto lenses) and image sensors may be on one face of the electronic device 200.

Referring to FIG. 3, the hinge cover may be between the first housing structure 210 and the second housing structure 220 to cover internal components (e.g., the hinge structure 230). According to one embodiment, the hinge structure 230 may be covered by a portion of the first housing structure 210 and a portion of the second housing structure 220, or may be exposed to the outside, depending on the state of the electronic device 200 (e.g., the unfolded state, the intermediate state, or the folded state).

For example, when the electronic device 200 is in the unfolded state (e.g., the completely unfolded state) as illustrated in FIG. 2, the hinge structure 230 may be covered by the first housing structure 210 and the second housing structure 220 not to be exposed. In an example, when the electronic device 200 is in the folded state (e.g., the completely folded state) as illustrated in FIG. 3, the hinge structure 230 between the first housing structure 210 and the second housing structure 220 may be exposed to the outside. For an example, when the electronic device 200 is in the intermediate state with an angle formed between the first housing structure 210 and the second housing structure 220, the hinge structure 230 between the first housing structure 210 and the second housing structure 220 may be partially exposed to the outside. However, the area exposed in the intermediate state may be smaller than that in the completely folded state. In one embodiment, the hinge structure 230 may include a curved surface.

According to one embodiment, the display 250 may be in a space formed by the foldable housing 201. For example, the display 250 may be in the recess formed by the foldable housing 201 and may be viewed from the outside through the front surface of the electronic device 200. For example, the display 250 may constitute most of the front surface of the electronic device 200. Accordingly, the front surface of the electronic device 200 may include the display 250, and a partial area of the first housing structure 210 and a partial area of the second housing structure 220, which are adjacent to the display 250. In addition, the rear surface of the electronic device 200 may include the first rear cover 215, a partial area of the first housing structure 210 adjacent to the first rear cover 215, the second rear cover 225, and a partial area of the second housing structure 220 adjacent to the second rear cover 225.

According to one embodiment, the display 250 may refer to a display in which at least one area transforms into a planar surface or a curved surface. In one embodiment, the display 250 may include a folding area 253, a first area 251 on one side of the folding area 253 (e.g., on the left side of the folding area 253 shown in FIG. 2), and a second area 252 on the other side of the folding area 253 (e.g., on the right side of the folding area 253 shown in FIG. 2).

However, such an area division of the display 250 as illustrated in FIG. 2 is provided merely as an example, and the display 250 may be divided into a plurality of areas (e.g., two areas or four or more areas) according to a structure or functions thereof. In an example, as shown in FIG. 2, the display 250 may be divided into areas based on the folding area 203 extending in parallel to the folding axis A. However, in an example, the display 250 may be divided into areas based on another folding axis (e.g., a folding axis (e.g., the folding axis C in FIG. 5) parallel to a width direction of an electronic device).

According to one embodiment, the display 250 may couple to or be adjacent to a touch panel in which a touch sensing circuit and a pressure sensor configured to measure an intensity (or pressure) of a touch are provided. For example, the display 250 is an example of a touch panel and may be coupled to or adjacent to a touch panel for detecting an electromagnetic resonance (EMR)-type stylus pen.

According to one embodiment, the first area 251 and the second area 252 may generally have symmetrical shapes with respect to the folding area 253 except that the second area 252 may include a notch cut due to the sensor area 222. In such an embodiment, the other areas of the second area 252 may be symmetrical to the first area 251. In such an embodiment, the first area 251 and the second area 252 may include mutually symmetrical portions and mutually asymmetrical portions.

According to one embodiment, the edge thickness of each of the first area 251 and the second area 252 may be different from the edge thickness of the folding area 253. The edge thickness of the folding area 253 may be less than those of the first area 251 and the second area 252. For example, the first area 251 and the second area 252 may be asymmetrical in terms of thickness when cross-sectionally viewed. For example, the edge of the first area 251 may be formed to have a first radius of curvature and the edge of the second area 252 may be formed to have a second radius of curvature, wherein the second radius of curvature is different from the first radius of curvature. For example, the first area 251 and the second area 252 may be symmetrical in terms of thickness when viewing the cross-sections of the first area 251 and the second area 252.

Hereinafter, each area of the display 250 and operations of the first housing structure 210 and the second housing structure 220 depending on the state (e.g., a folded state, the unfolded state, or the intermediate state) of the electronic device 200 will be described.

According to one embodiment, when the electronic device 200 is in the unfolded state (e.g., FIG. 2), the first housing structure 210 and the second housing structure 220 may face the same direction while forming an angle of 180 degrees. The surface of the first area 251 of the display 250 and the surface of the second area 252 thereof may face the same direction (e.g., the front direction of an electronic device) while forming an angle of 180 degrees. The folding area 253 may form or be on a same plane together with the first area 251 and the second area 252.

According to one embodiment, when the electronic device 200 is in the folded state (e.g., FIG. 3), the first housing structure 210 and the second housing structure 220 may face each other. The surface of the first area 251 and the surface of the second area 252 of the display 250 may face each other and form a narrow angle (e.g., an angle between 0 degrees to 10 degrees). At least a portion of the folding area 253 may form a curved surface having a predetermined curvature (or a radius of curvature).

According to one embodiment, when the electronic device 200 is in the intermediate state, the first housing structure 210 and the second housing structure 220 may form a certain angle therebetween. The surface of the first area 251 and the surface of the second area 252 of the display 250 may form an angle greater than that in the folded state and less than that in the unfolded state. At least a portion of the folding area 253 may include a curved surface having a predetermined curvature, and the curvature in the unfolded state may be less than that in the folded state.

FIG. 4A illustrates the electronic device 200 in a completely unfolded state, and FIG. 4B illustrates the electronic device 200 in a partially folded state (or an intermediate state). As described above, the state of the electronic device 200 may change to the folded state or the unfolded state. According to one embodiment, when viewed in a direction of a folding axis (e.g., the folding axis A of FIG. 2), the electronic device 200 may be folded in two types, i.e., an "in-folding" type in which the front surface of the electronic device 200 folds to form an acute angle and an "out-folding" type in which the front surface of the electronic device 200 folds to form an obtuse angle. In an example, in the state in which the electronic device 200 folds in the in-folding type, the first surface of the first housing structure 210 may face the third surface of the second housing structure 220. In the completely unfolded state, the first surface of the first housing structure 210 and the third surface of the second housing structure 220 may face the same direction (e.g., a direction parallel to the z-axis).

In an embodiment, where the electronic device 200 folds in the out-folding type, the second surface of the first housing structure 210 may face the fourth surface of the second housing structure 220.

In an embodiment, although not shown in the drawings, the electronic device 200 may include a plurality of hinge axes (e.g., two parallel hinge axes including the folding axis A of FIG. 2 and another axis parallel to the folding axis A). In such an embodiment, the electronic device 200 may also fold in a "multi-folding" type in which the in-folding type combines with the out-folding type.

The in-folding type may refer to a state in which the display 250 is not exposed to the outside in the completely folded state. The out-folding type may refer to a state in which the display 250 is exposed to the outside in the completely folded state. FIG. 4B shows the electronic device 200 in an intermediate state in which the electronic device 200 is partially unfolded in an in-folding process.

Although the state in which the electronic device 200 folds in the in-folding type is described below for convenience's sake, the description may be similarly applied to the state in which the electronic device 200 folds in the out-folding type.

Figure 5:
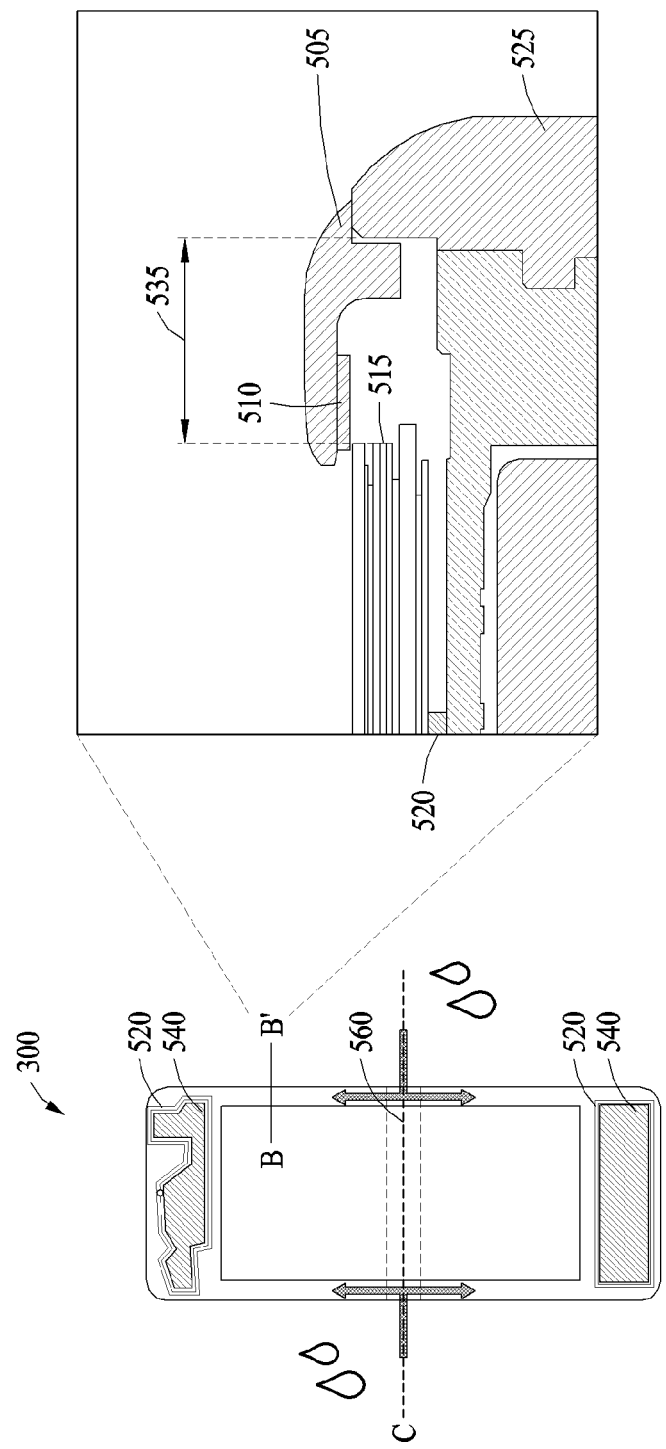
FIG. 5 is a diagram illustrating a path through which water penetrates an electronic device when the electronic device is immersed in water according to one embodiment.

FIG. 5 is a diagram illustrating a path through which water penetrates an electronic device when the electronic device is immersed in water according to one embodiment.

FIG. 5 illustrates a cross-sectional view of an electronic device 300 (e.g., the electronic device 101 of FIG. 1 or the electronic device 200 of FIG. 2), taken along line B-B', where the electronic device 300 of a foldable type has a folding axis C parallel to the width direction of the electronic device 300 and a waterproof area 540 formed by waterproof tape 520 on the rear surface of a flexible or foldable display 515 (hereinafter, simply referred to as the "display" (e.g., the display 250)). Although in FIG. 5 the electronic device 300, which is foldable with the folding axis C parallel to the width direction of the electronic device 300, is illustrated as an example, the following description may be also applied to an electronic device having the folding axis A of FIG. 2.

In one embodiment, the electronic device 300 of the foldable type may support a waterproof function to improve usability. For example, the electronic device 300 may include the waterproof tape 520. The internal components of the electronic device 300, which may malfunction due to moisture, may be disposed in the waterproof area 540 so that the waterproof tape 520 may protect the internal components of the electronic device 300 from moisture.

The waterproof structure of the electronic device 300 of the foldable type may be different from that of the electronic device 300 of a bar type. Water penetrating the electronic device 300 of the foldable type may affect antenna performance although the electronic device 300 has a waterproof function.

Referring to the cross-sectional view taken along line B-B' in FIG. 5, the electronic device 300 may include the display 515, the waterproof tape 520 on the rear surface of the display 515, a housing 525 (e.g., the housing 201 of FIG. 2), a display decoration portion 505 covering a gap 535 between the display 515 and the housing 525, and a tape 510 with elasticity between the display decoration portion 505 and the display 515.

In one embodiment, the electronic device 300 including the display 515 may include the gap 535 between the display 515 and the housing 525 to prevent interference between the display 515 and the housing 525. The interference may be caused by slipping during folding of the electronic device 300. The gap 535 may be covered by the display decoration portion 505 as the exposure of the gap 535 to the outside may degrade the appearance of the electronic device 300 or allow foreign material to penetrate the electronic device 300. Therefore, the electronic device 300 may include the display decoration portion 505.

In one embodiment, the electronic device 300 may include the tape 510 with elasticity between the display decoration portion 505 and the display 515 for a buffer against the slipping of the display 515. The tape 510 may prevent the electronic device 300 from including the waterproof tape 520 or bonding on the front surface of the display 515 so that a waterproof structure may be implemented on the rear surface of the display 515. For example, the electronic device 300 may include the waterproof tape 520 on the rear surface of the display 515.

In one embodiment, a folding area 560 of the display 515 and a hinge structure (not shown) of the housing 525 (e.g., the hinge structure 230 of FIG. 2) have different radii when folded so that the folding area 560 of the display 515 and the hinge structure (not shown) of the housing 525 may not be adhered to each other. Therefore, the hinge structure may not be waterproof by adhering the display 515 and the housing 525, and the waterproof area 540 on the rear surface of the display 515 may be formed inside a portion of the electronic device 300 in FIG. 5.

In an embodiment having the structure shown in FIG. 5, when the electronic device 300 is immersed in water (that is, a water immersion of the electronic device 300 occurs), water may penetrate into the electronic device 300 through the hinge structure of the electronic device 300 and spread through the gap 535 along the inner edge of the electronic device 300. Herein, the electronic device 300 may be considered as being immersed in water (or a water immersion of the electronic device 300 is considered as being occurred) when the electronic device 300 is in a state where water is present inside the electronic device 300 due to immersion of the electronic device 300 in water or the like (e.g., being exposed to a high pressure water stream).

In one embodiment, the housing 525 may include a metal material and be used as an antenna. When the electronic device 300 is immersed in water (that is, the water immersion of the electronic device 300 occurs) and water penetrates the inner edge of the electronic device 300, the penetration may not affect the configuration in the waterproof area 540 but may affect antenna impedance so that shifted impedance may cause a call drop and deteriorate throughput and a communication function.

When the electronic device 300 is immersed in water (that is, the water immersion of the electronic device 300 occurs), a user not easily recognize the water immersion of the electronic device 300 (or presence of water inside the electronic device 300) and antenna performance deterioration thereby.

In one embodiment, communication performance may be restored back to its original level once moisture is removed. For example, when a user recognizes that the electronic device 300 is immersed in water (or water is inside the electronic device 300), the user may shake off moisture in the electronic device 300, such that its communication performance may be restored within a short time.

According to one embodiment, the electronic device 300 may notify a user that the electronic device 300 is immersed in water (or water is inside the electronic device 300) upon recognition thereof so that the user may take action to improve the communication performance deteriorated by moisture.

Figure 6:
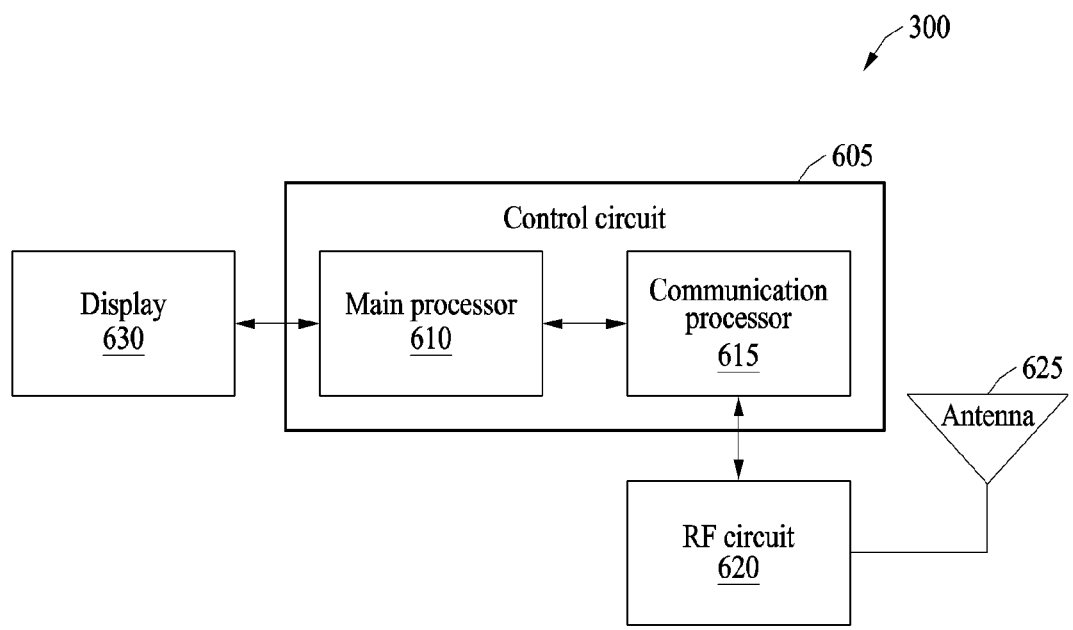
FIG. 6 is a block diagram illustrating an embodiment of an electronic device.

FIG. 6 is a block diagram illustrating an embodiment of an electronic device.

Referring to FIG. 6, an electronic device 300 according to one embodiment may include a display 630, at least one antenna 625 configured to transmit and receive a radio frequency (RF) signal, an RF circuit 620 configured to process the RF signal, and a control circuit 605 configured to control the display 630 and the RF circuit 620. In one embodiment, the control circuit 605 may include a main processor 610 configured to control the display 630 and a communication processor 615 configured to control the RF circuit 620.

In one embodiment, the electronic device 300 may notify a user that the electronic device 300 is immersed in water (or water is inside the electronic device 300), upon recognition thereof, to allow the user to take action to improve communication performance deteriorated by moisture.

In one embodiment, an RF signal transmitted and received through the antenna 625 may be provided back as feedback to the RF circuit 620. The control circuit 605 may receive a feedback signal, which is the RF signal to be provided back as feedback from the antenna 625 to the RF circuit 620.

In one embodiment, the control circuit 605 may determine whether the electronic device 300 is immersed in water (or water is inside the electronic device 300) based on the feedback signal. When the electronic device 300 is immersed in water (or water is inside the electronic device 300), moisture may affect antenna performance Therefore, the control circuit 605 may check the antenna performance through the feedback signal and determine whether the electronic device 300 is immersed in water (or water is inside the electronic device 300).

For example, in one embodiment, the control circuit 605 may determine the impedance of the antenna 625 based on the feedback signal. The control circuit 605 may determine whether the electronic device 300 is immersed in water (or water is inside the electronic device 300) based on the determined impedance. When the antenna performance is in a normal state, the antenna impedance may be matched. When the electronic device 300 is immersed in water, the antenna impedance may be shifted out of the impedance matching state and the control circuit 605 and may determine a degree of the impedance shift and whether the electronic device 300 is immersed in water (or water is inside the electronic device 300).

In one embodiment, the control circuit 605 may determine whether the determined impedance of the antenna 625 is out of a set threshold range based on the feedback signal. The control circuit 605 may determine that the electronic device 300 is immersed in water (or water is inside the electronic device 300) when the impedance is out of a threshold range.

In one embodiment, the control circuit 605 may determine whether the electronic device 300 is immersed in water (or water is inside the electronic device 300) based on whether interference occurs between antennas (e.g., antennas 625) included in the electronic device 300. For example, when the electronic device 300 is immersed in water (or water is inside the electronic device 300), the antennas included in the electronic device 300 may be electrically conductive due to moisture. Interference between the antennas is not great through air, but when the antennas are electrically conductive due to moisture, the interference may increase. The control circuit 605 may determine whether interference occurs by comparing feedback signals from antennas to the RF circuit 620 to one another and determine whether the electronic device is immersed in water (or water is inside the electronic device 300) based on the occurrence of the interference.

In one embodiment, the control circuit 605 may determine whether the electronic device is immersed in water (or water is inside the electronic device 300) using a pull-up power line of a flexible printed circuit board (FPCB), including the components of the electronic device 300. For example, the FPCB may include a waterproof area and the pull-up power line outside the waterproof area. The pull-up power line may be exposed. When the electronic device 300 is immersed in water (or water is inside the electronic device 300), a resistance value of the pull-up power line may change due to moisture. The control circuit 605 may determine whether immersion (or water ingress into the electronic device 300) occurs based on resistance of the pull-up power line of the FPCB.

In one embodiment, the control circuit 605 may determine whether the electronic device 300 is immersed in water (or water is inside the electronic device 300), based on at least one selected from impedance determined based on the feedback signal, interference between antennas, and resistance of the pull-up power line of the FPCB.

In one embodiment, an operation of the control circuit 605 may be performed by at least one selected from the main processor 610 and the communication processor 615.

In one embodiment, the control circuit 605 may perform a set operation once it is determined that the electronic device 300 is immersed in water (or water is inside the electronic device 300). For example, the set operation may include at least one selected from outputting an immersion notification to a user, vibrating the electronic device 300, and outputting sound. Once it is determined that the electronic device 300 is immersed in water (or water is inside the electronic device 300), the control circuit 605 may output an immersion notification on the display 630. In one embodiment, the immersion notification may include a user's action guide. When the immersion notification is output on the display 630, the user may see the immersion notification and shake off moisture from the electronic device 300.

Hereinafter, a feedback circuit and a feedback signal will be described with reference to FIG. 7.

Figure 7:
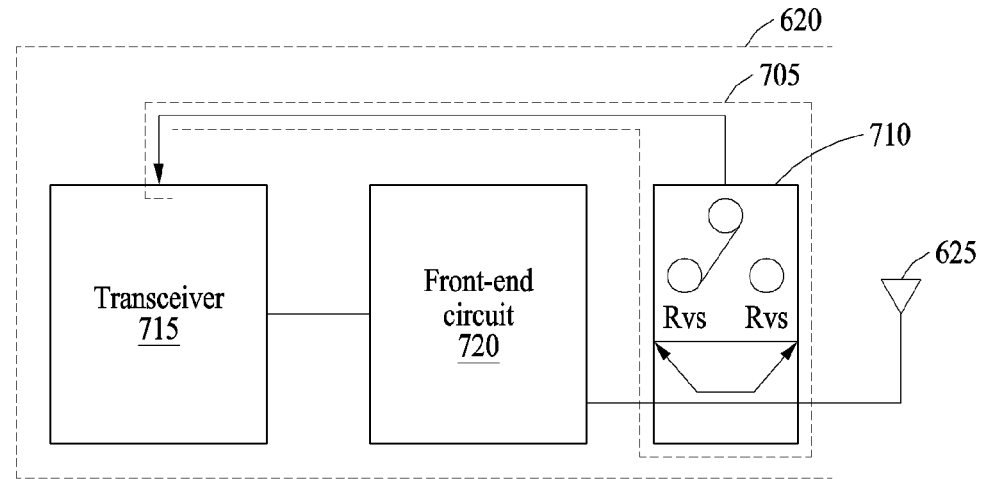
FIG. 7 is a block diagram illustrating a feedback circuit included in a radio frequency (RF) circuit of an electronic device according to one embodiment.

FIG. 7 is a block diagram illustrating a feedback circuit included in an RF circuit of an electronic device according to one embodiment.

Referring to FIG. 7, in one embodiment, an RF circuit 620 may include a front-end circuit 720 that processes an analog RF signal transmitted and received through an antenna 625, a transceiver 715 that converts between an analog RF signal and a digital signal, and a feedback circuit 705, through which a feedback signal corresponding to the analog RF signal is provided back as feedback to the transceiver 715. In one embodiment, a control circuit may receive a feedback signal from the transceiver 715.

However, FIG. 6 shows only one embodiment of the RF circuit 620. Alternatively, the electronic device may include a plurality of antennas 625, and the RF circuit 620 may include a plurality of front-end circuits 720 that processes an RF signal transmitted and received through each of the antennas 625, and the feedback circuit 705, through which a feedback signal corresponding to the RF signal transmitted and received through each of antennas 625 is provided back to the transceiver 715.

In one embodiment, the feedback circuit 705 may include a coupler 710 that generates a feedback signal corresponding to an RF signal transmitted and received through the antenna 625. In one embodiment, a first feedback signal corresponding to an RF signal transmitted through the antenna 625 may be provided back as feedback to the transceiver 715 through the feedback circuit 705, and a second feedback signal may be provided back as feedback to the transceiver 715 through the feedback circuit 705. The second feedback signal may correspond to a signal obtained by reflecting the RF signal transmitted through the antenna 625 by the antenna 625. Hereinafter, an embodiment of a method of determining the impedance of an antenna 625 from a feedback signal and determining whether an electronic device is immersed in water (or water is inside the electronic device 300) based on the determined impedance will be described with reference to FIGS. 8 and 9.

Figure 8:
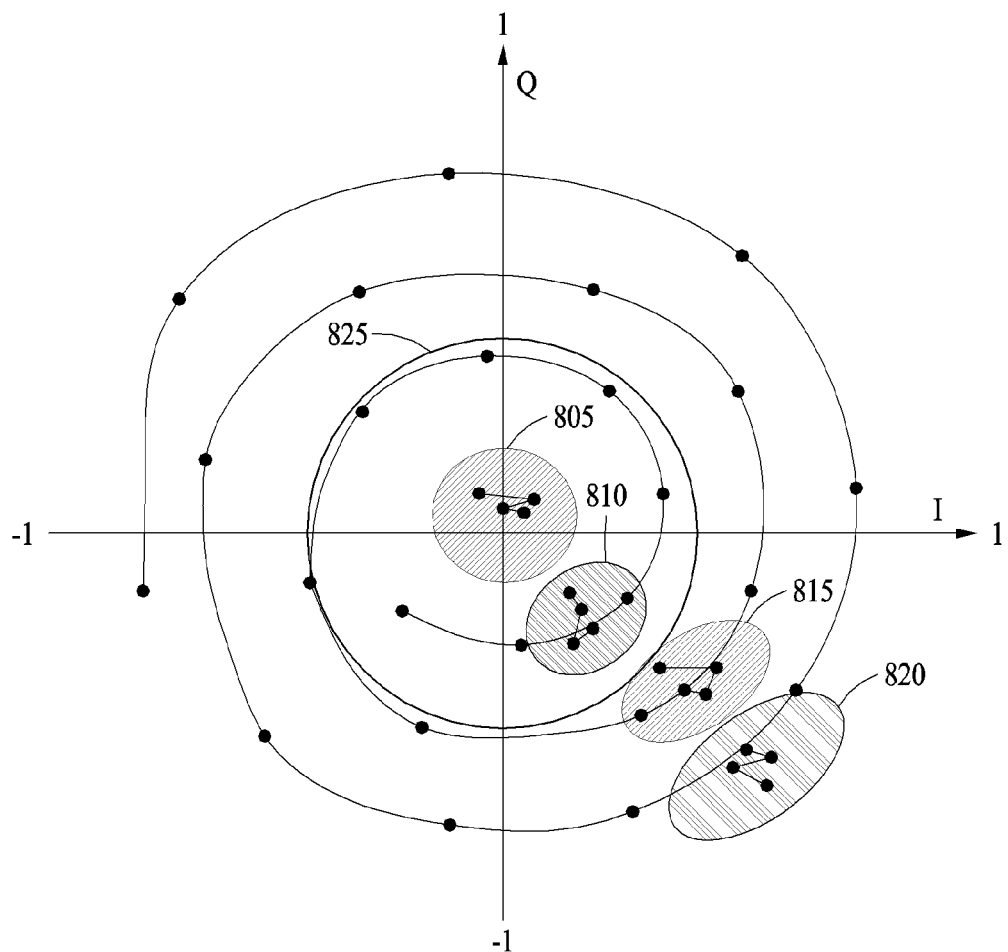
FIGS. 8 and 9 are diagrams illustrating determining whether an electronic device is immersed in water, according to one embodiment.
Figure 9:
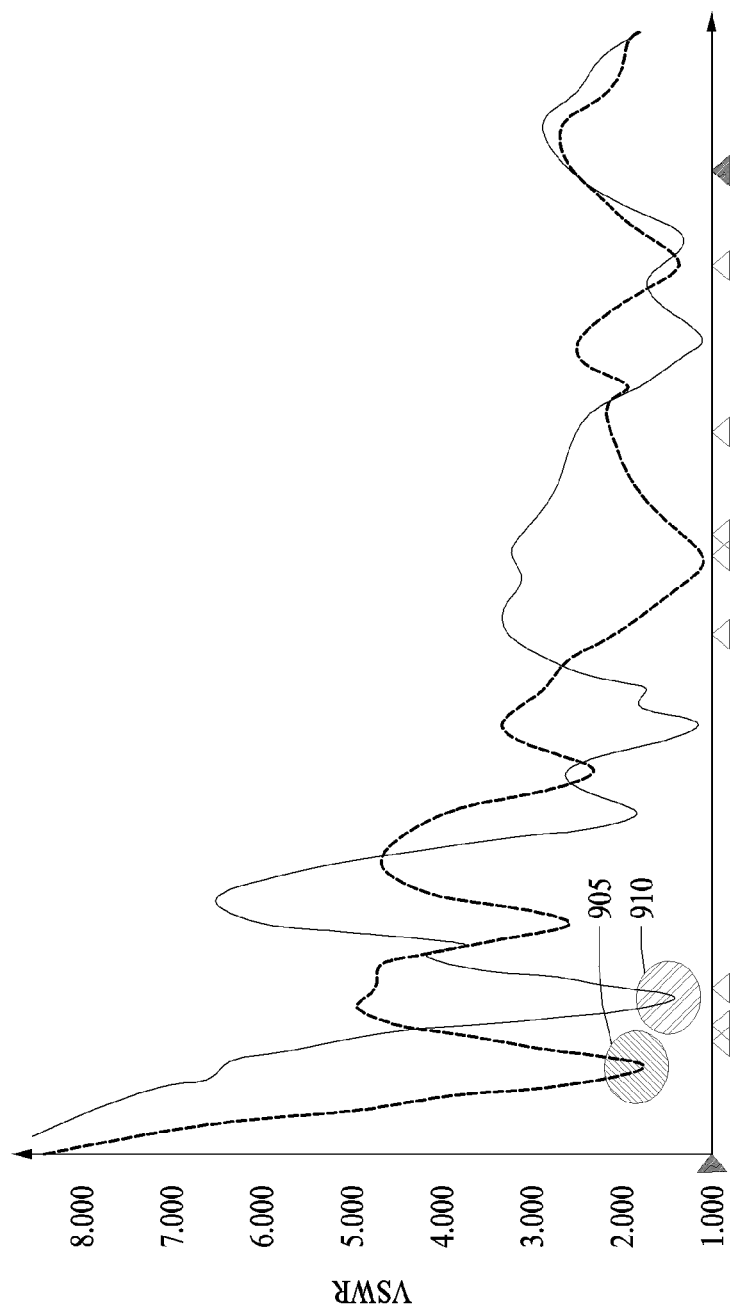

FIGS. 8 and 9 are diagrams illustrating determining a water immersion of an electronic device according to one embodiment.

FIG. 8 illustrates an I-Q diagram in which a real value I and an imaginary value Q of the reflection coefficient of the antenna 625 are shown.

For example, the reflection coefficient of the antenna 625 may be determined based on Equation 1.

$$\Gamma = \frac{V_{rev}}{V_{fwd}} \qquad \text{[Equation 1]}$$

In Equation 1, $\Gamma$ denotes a reflection coefficient, $V_{fwd}$ denotes a voltage of an RF signal input to the antenna 625, and $V_{rev}$ denotes a voltage of a reflected signal of an RF signal input to the antenna 625. The RF signal input to the antenna 625 may be reflected due to an impedance difference between the RF circuit 620 and the antenna 625 at a connection terminal, and a real value I and an imaginary value Q of the ratio of the input RF signal to the reflected signal may be expressed as in FIG. 8.

In one embodiment, the control circuit 605 may receive, from the RF circuit 620, a first feedback signal, which an RF signal input to the antenna 625 to be provided back as feedback, and a second feedback signal, which is the input RF signal to be reflected by the antenna 625 and provided back as feedback.

In one embodiment, the control circuit 605 may determine the impedance of the antenna 625 from the first feedback signal and the second feedback signal. For example, the control circuit 605 may determine a reflection coefficient, based on a voltage of the first feedback signal (e.g., the voltage $V_{fwd}$ in Equation 1) and a voltage of the second feedback signal (e.g., the voltage $V_{rev}$ in Equation 1). In one embodiment, the control circuit 605 may determine the impedance of the antenna 625 from the reflection coefficient.

The control circuit 605 may determine whether the electronic device 300 is immersed in water (or water is inside the electronic device 300), based on at least one selected from the determined reflection coefficient and the determined impedance. For example, the control circuit 605 may determine that the electronic device 300 is immersed in water (or water is inside the electronic device 300) when the determined reflection coefficient is out of a reflection coefficient threshold range or the determined impedance is out of an impedance threshold range.

For example, FIG. 8 shows real values I and imaginary values Q of reflection coefficients determined in various situations.

In state 805, where an electronic device 300 is not immersed in water (or no water is inside the electronic device 300), a magnitude of a signal reflected from an antenna 625 may be small and a real value I and an imaginary value Q of a reflection coefficient may be close to 0 as impedance is matched.

As change in the impedance of the antenna 625 due to moisture increases, a real value I and an imaginary value Q of a reflection coefficient may move away from zero. For example, in state 820, where the electronic device 300 is completely immersed in water, a real value I and an imaginary value Q of a reflection coefficient may be farthest from 0.

In one embodiment, the control circuit 605 may determine that the electronic device 300 is immersed in water (or water is inside the electronic device 300) when at least one selected from a real value I and an imaginary value Q of a reflection coefficient is out of a reflection coefficient threshold range 825. For example, in states 805 and 810, the control circuit 605 may determine that the electronic device 300 is not immersed in water, and in the states 815 and 820, the control circuit 605 may determine that the electronic device 300 is immersed in water.

In one embodiment, the control circuit 605 may determine an impedance of the antenna 625 from a reflection coefficient and determine that the electronic device 300 is immersed in water when the determined impedance is out of an impedance threshold range.

FIG. 9 illustrates a voltage standing wave ratio (VSWR) of an antenna 625 in state 910, where an electronic device 300 according to one embodiment is not immersed in water, and the VSWR of the antenna 625 in state 905, where the electronic device 300 is immersed in water.

FIG. 9 shows that in state 905, where the electronic device 300 is immersed in water, a resonant frequency shifts compared to a resonant frequency in state 910, where the electronic device 300 is not immersed in water. In one embodiment, when a resonant frequency of the antenna 625 is shifted by a threshold value or greater compared to a reference resonant frequency, a control circuit 605 may determine that the electronic device 300 is immersed in water. In one embodiment, a reference frequency may be a resonant frequency in state 910, where the electronic device 300 is not immersed in water.

In one embodiment, when it is determined that the electronic device 300 is immersed in water, the control circuit 605 may perform a set operation.

Hereinafter, a method of recognizing the immersion of an electronic device in water, according to one embodiment, will be described with reference to FIG. 10.

Figure 10:
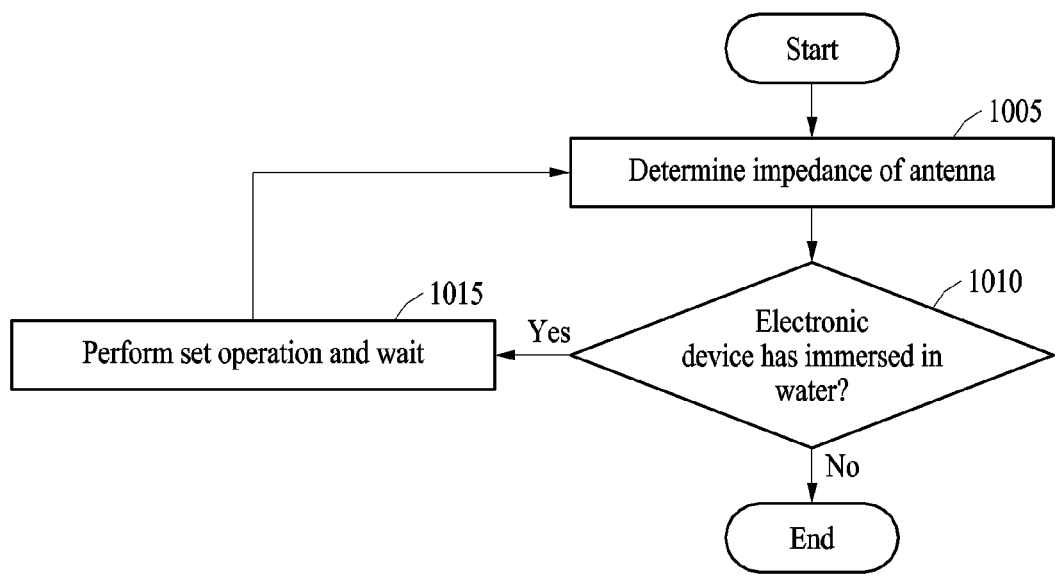
FIG. 10 is a flowchart illustrating a method of recognizing a water immersion of an electronic device, according to one embodiment.

FIG. 10 is a flowchart illustrating a method of recognizing a water immersion of an electronic device, according to one embodiment.

Referring to FIG. 10, in operation 1005, an electronic device (e.g., the electronic device 300) may determine at least one selected from a reflection coefficient and an impedance of an antenna (e.g., the antenna 625). For example, the electronic device may receive, from an RF circuit (e.g., the RF circuit 620), a feedback signal, which is an RF signal to be provided back as feedback from the antenna of the electronic device to the RF circuit, and determine at least one selected from a reflection coefficient and an impedance of the antenna based on the received feedback signal.

In one embodiment, the electronic device may receive, from the RF circuit, a first feedback signal, which an RF signal input to the antenna of the electronic device to be provided back as feedback, and a second feedback signal, which the input RF signal to be reflected by the antenna and provided back as feedback. The electronic device may determine a reflection coefficient based on a voltage of the first feedback signal and a voltage of the second feedback signal. The electronic device may determine an impedance of the antenna based on the determined reflection coefficient.

In operation 1010, the electronic device may determine whether the electronic device is immersed in water (or water is inside the electronic device 300), based on at least one selected from the determined reflection coefficient and the determined impedance. For example, the electronic device may determine that the electronic device is immersed in water (or water is inside the electronic device 300) when the determined reflection coefficient is out of a reflection coefficient threshold range or the determined impedance is out of an impedance threshold range.

When it is determined that the electronic device is immersed in water (or water is inside the electronic device 300) in operation 1010, the electronic device may perform a set operation in operation 1015. For example, the electronic device may output an immersion notification on a display of the electronic device. In one embodiment, the immersion notification may include a user's action instruction, for example, "Please shake off water in your electronic device". The immersion notification may include, for example, vibration and sound notifications of the electronic device.

In one embodiment, the electronic device may wait for a set time after performing a set operation. When the set time passes, the electronic device may perform operations 1005 and 1010 again to determine whether the electronic device is immersed in water (or water is inside the electronic device 300).

In operation 1010, when it is determined that the electronic device is not immersed in water, the electronic device may not perform an additional operation.

When the electronic device is immersed in water (or water is inside the electronic device 300), the electronic device according to one embodiment may recognize immersion through operations 1005, 1010, and 1015 and notify a user to take action to improve communication performance deteriorated by moisture. The communication performance of the electronic device may be quickly restored by the user identifying a cause of the deteriorated communication performance through a notification and shaking off water in the electronic device.

Figure 11:
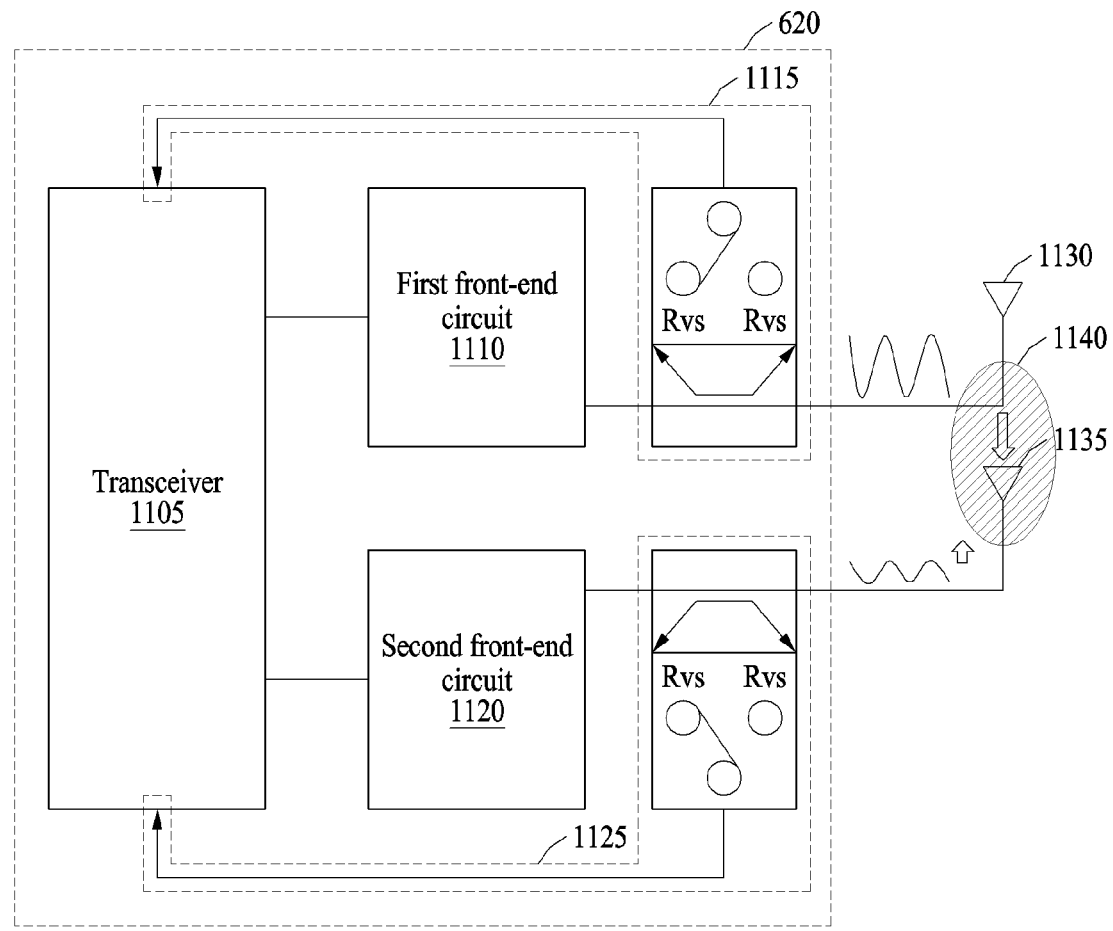
FIG. 11 is a diagram illustrating a method of recognizing the water immersion of an electronic device, according to one embodiment.

FIG. 11 is a diagram illustrating a method of recognizing a water immersion of an electronic device, according to one embodiment.

Referring to FIG. 11, an embodiment of an electronic device 300 may include a first antenna 1130, a second antenna 1135, and an RF circuit, wherein the RF circuit may include a first front-end circuit 1110 that processes a first RF signal transmitted and received through the first antenna 1130, a first feedback circuit 1115, through which a third feedback signal corresponding to the first RF signal to be provided back to a transceiver 1105, a second front-end circuit 1120 that processes a second RF signal transmitted and received through the second antenna 1135, and a second feedback circuit 1125, through which a fourth feedback signal corresponding to the second RF signal is provided back to the transceiver 1105.

In one embodiment, the electronic device 300 may determine whether the electronic device 300 is immersed in water (or water is inside the electronic device 300) based on the occurrence of interference between the first antenna 1130 and the second antenna 1135. For example, when the electronic device 300 is immersed in water (or water is inside the electronic device 300), the first antenna 1130 and the second antenna 1135 included in the electronic device 300 may be electrically conductive due to moisture 1140 in the electronic device 300. Interference through air between the first antenna 1130 and the second antenna 1135 is not great, but when the first antenna 1130 and the second antenna 1135 are electrically conductive due to the moisture 1140, the interference may be greater.

A control circuit may receive, from an RF circuit (e.g., the RF circuit of the transceiver 1105), the third feedback signal, which is the first RF signal to be provided back as feedback from the first antenna 1130 to the RF circuit, and the fourth feedback signal, which is the second RF signal to be provided back as feedback from the second antenna 1135 to the RF circuit. Then, the control circuit may compare an intensity of the third feedback signal to an intensity of the fourth feedback signal and determine whether interference occurs.

When a ratio of an intensity of the third feedback signal to an intensity of the fourth feedback signal is equal to or greater than a threshold value, the control circuit may determine that the interference has occurred. When the interference occurs, the control circuit may determine that the electronic device 300 is immersed in water (or water is inside the electronic device 300).

In one embodiment, the control circuit may perform a set operation when it is determined that the electronic device 300 is immersed in water (or water is inside the electronic device 300). For example, a set operation may include at least one selected from outputting an immersion notification to a user, vibrating the electronic device, and outputting sound.

Hereinafter, a method of recognizing the water immersion of an electronic device, according to one embodiment, will be described with reference to FIG. 12.

Figure 12:
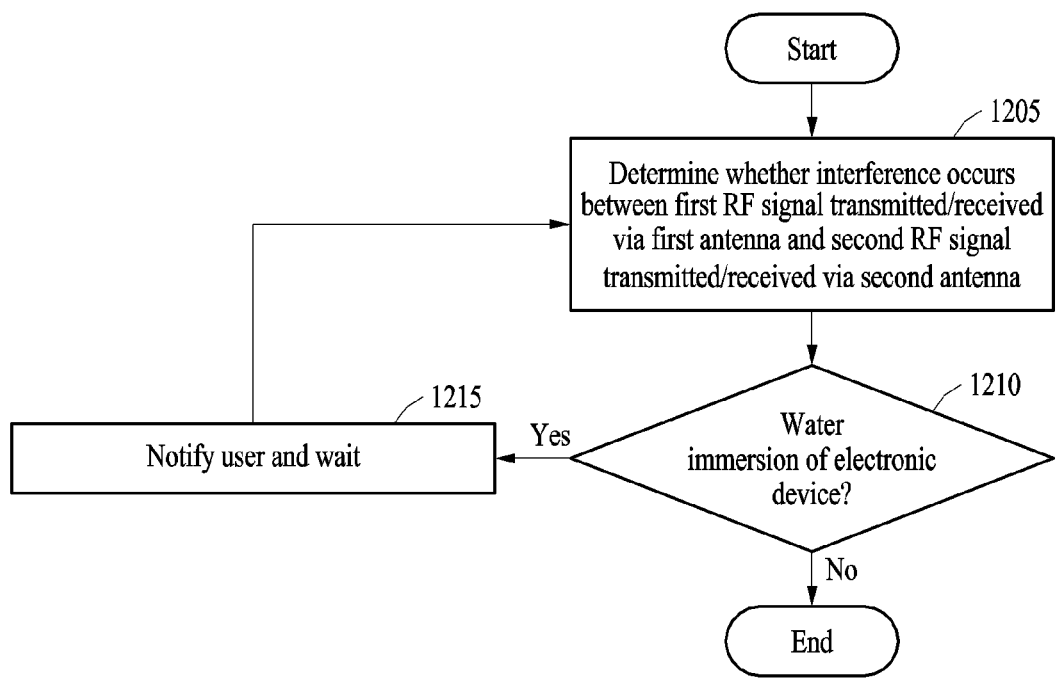
FIG. 12 is a flowchart illustrating a method of recognizing the water immersion of an electronic device, according to one embodiment.

FIG. 12 is a flowchart illustrating a method of recognizing the water immersion of an electronic device, according to one embodiment.

Referring to FIG. 12, in operation 1205, an electronic device (e.g., the electronic device 300) may determine whether interference occurs between a first RF signal transmitted and received through a first antenna (e.g., the first antenna 1130) of the electronic device and a second RF signal transmitted and received through a second antenna (e.g., the second antenna 1135) of the electronic device. For example, when the electronic device is immersed in water (or the water immersion of the electronic device occurs), the first antenna and the second antenna included in the electronic device may be electrically conductive due to moisture in the electronic device. Interference through air between the first antenna and the second antenna is not great, but when the first antenna and the second antenna are electrically conductive due to moisture, the interference may be increase.

In order to determine whether interference occurs, the electronic device may receive, from an RF circuit (e.g., the RF circuit 620), a third feedback signal, which is the first RF signal to be provided back as feedback from the first antenna to the RF circuit, and a fourth feedback signal, which is the second RF signal to be provided back as feedback from the second antenna to the RF circuit, and may compare an intensity between the third feedback signal and the fourth feedback signal. When a ratio of an intensity of the third feedback signal to the fourth feedback signal is equal to or greater than a threshold value, the electronic device may determine that the interference has occurred between the first RF signal and the second RF signal.

In operation 1210, the electronic device may determine whether the electronic device is immersed in water (or the water immersion of the electronic device occurs) based on the occurrence of interference between the first RF signal and the second RF signal. For example, when it is determined that interference occurs between the first RF signal and the second RF signal in operation 1205, the electronic device may determine that the electronic device is immersed in water (or the water immersion of the electronic device occurs).

When it is determined that the electronic device is immersed in water (or water is inside the electronic device) in operation 1210, the electronic device may perform a set operation in operation 1215. For example, the electronic device may output an immersion notification on a display of the electronic device. In one embodiment, the immersion notification may include a user's action instruction, for example, "Please shake off water in your electronic device". The immersion notification may include, for example, vibration and sound notifications of the electronic device.

The electronic device may wait for a set time after performing a set operation. When the set time passes, the electronic device may perform operations 1205 and 1210 again to determine whether the electronic device is immersed in water (or water is inside the electronic device).

When it is determined that the electronic device is not immersed in water in operation 1210, the electronic device may not perform an additional operation.

When the electronic device immerses in water, the electronic device may recognize immersion through operations 1205, 1210, and 1215 and notify a user to take action to improve communication performance deteriorated by moisture. Communication performance of the electronic device may be quickly restored by the user identifying a cause of deteriorated communication performance through the notification and shaking off water in the electronic device.

Figure 13A:
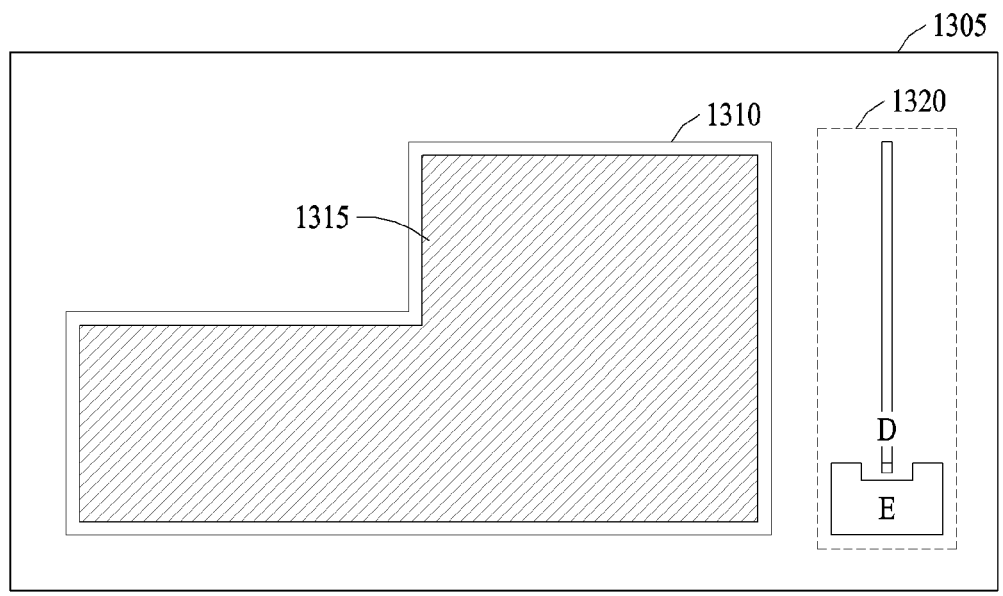
FIGS. 13A and 13B are diagrams illustrating a method of recognizing the water immersion of an electronic device, according to one embodiment.
Figure 13B:
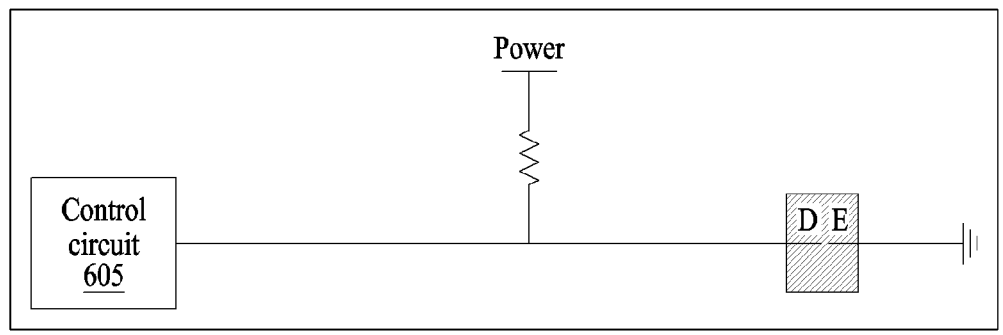

FIGS. 13A and 13B are diagrams illustrating a method of recognizing the water immersion of an electronic device, according to one embodiment.

Referring to FIG. 13A, illustrated are a waterproof area 1315 (e.g., the waterproof area 540 of FIG. 5) on an FPCB 1305 included in an electronic device (e.g., the electronic device 300) and a pull-up power line 1320 outside the waterproof area 1315. For example, the FPCB 1305 may include a driving circuit of a display (e.g., the display 630) in the waterproof area 1315. The waterproof area 1315 may be provided or formed by waterproof tape 1310. In one embodiment, the electronic device may determine whether the electronic device is immersed in water (or the water immersion of the electronic device occurs), using the pull-up power line 1320 of the FPCB 1305.

For example, referring to FIG. 13B, the pull-up power line 1320 is illustrated exposed. When the electronic device is immersed in water (or the water immersion of the electronic device occurs), a resistance value of the pull-up power line 1320 may change due to moisture. An exposed portion of the pull-up power line 1320 may be close to a ground terminal and may couple to the ground terminal due to moisture, which may short circuit the pull-up power line 1320.

One side of the pull-up power line 1320 may couple to a control circuit 605 in the waterproof area 1315. For example, one side of the pull-up power line 1320 may couple to a main processor in the waterproof area 1315. The control circuit 605 may measure a resistance value of the pull-up power line 1320 and determine that the electronic device is immersed in water when a resistance value of the pull-up power line 1320 is equal to or less than a reference resistance.

In one embodiment, the control circuit 605 may perform a set operation when it is determined that the electronic device is immersed in water (or the water immersion of the electronic device occurs). For example, the set operation may include at least one selected from outputting an immersion notification to a user, vibrating the electronic device, and outputting sound. When it is determined that the electronic device is immersed in water (or the water immersion of the electronic device occurs), the control circuit 605 may output an immersion notification on a display. In one embodiment, the immersion notification may include a user's action instruction and when the immersion notification is output on the display, the user may see the notification and shake off moisture from the electronic device.

Figure 14:
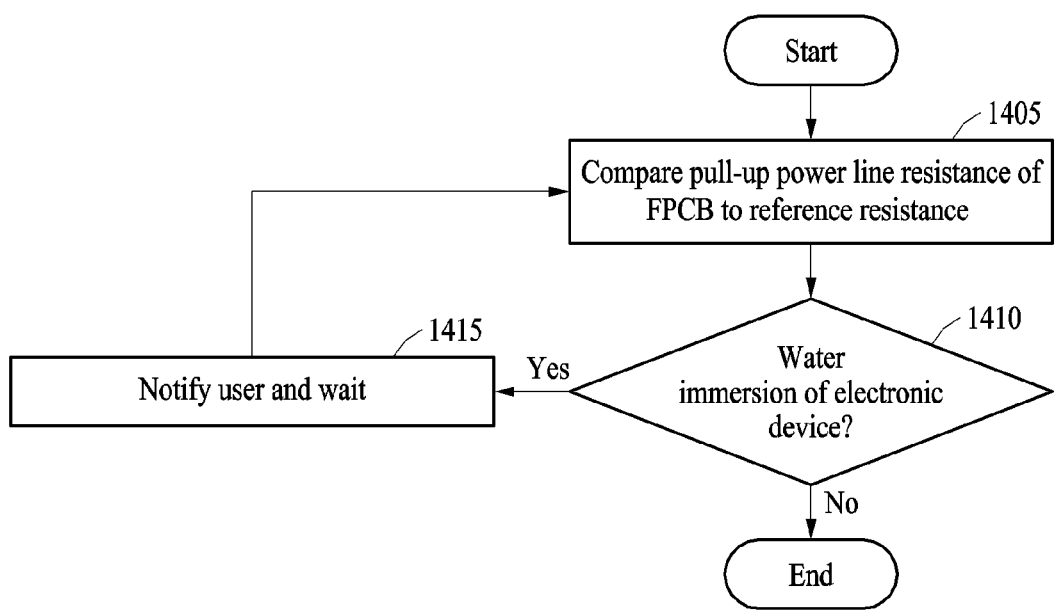
FIG. 14 is a flowchart illustrating a method of recognizing the water immersion of an electronic device, according to one embodiment.

FIG. 14 is a flowchart illustrating a method of recognizing the water immersion of an electronic device, according to one embodiment.

Referring to FIG. 14, in operation 1405, an electronic device (e.g., the electronic device 300) may identify a resistance of a pull-up power line (e.g., the pull-up power line 1320) included in an FPCB (e.g., the FPCB 1305) of the electronic device and compare the resistance of the pull-up power line to a reference resistance.

In operation 1410, the electronic device may determine whether the electronic device is immersed in water (or the water immersion of the electronic device occurs) based on the comparison result of operation 1405. When the electronic device is immersed in water (or the water immersion of the electronic device occurs), a resistance value of the pull-up power line may change due to moisture. An exposed portion of the pull-up power line may be close to a ground terminal and may couple to the ground terminal due to moisture and short circuit the pull-up power line. The electronic device may determine that the electronic device is immersed in water (or the water immersion of the electronic device occurs) when a resistance value of the pull-up power line is lower than a reference voltage.

When it is determined that the electronic device is immersed in water (or the water immersion of the electronic device occurs) in operation 1410, the electronic device may perform a set operation in operation 1415. For example, the electronic device may output an immersion notification on a display of the electronic device. In one embodiment, the immersion notification may include a user's action instruction, for example, "Please shake off water in your electronic device". The immersion notification may include, for example, vibration and sound notifications of the electronic device.

The electronic device may wait for a set time after performing a set operation. When the set time passes, the electronic device may perform operations 1405 and 1410 again to determine whether the electronic device is immersed in water (or the water immersion of the electronic device occurs).

In operation 1410, when it is determined that the electronic device is not immersed in water, the electronic device may not perform an additional operation.

When the electronic device is immersed in water (or the water immersion of the electronic device occurs), the electronic device may recognize the water immersion thereof through operations 1405, 1410 and 1415 and notify a user to take action to improve communication performance deteriorated by moisture. The communication performance of the electronic device may be quickly restored by the user identifying the cause of the deteriorated communication performance through the notification and shaking off water in the electronic device.

Although the embodiments of FIGS. 10, 12 and 14 have been individually described for more concise description, the embodiments may be used interchangeably, as desired.

An electronic device 300 according to one embodiment may include an antenna 625 for transmitting and receiving an RF signal, an RF circuit 620 for processing the RF signal, and a control circuit 605 for controlling the RF circuit 620, where the control circuit 605 may receive, from the RF circuit 620, a feedback signal, which is an RF signal to be provided back as feedback from the antenna 625 to the RF circuit 620, may determine an impedance of the antenna 625 based on the feedback signal, determine whether the electronic device 300 is immersed in water (or the water immersion of the electronic device occurs) and perform a set operation once it is determined that the electronic device 300 is immersed in water (or the water immersion of the electronic device occurs).

The set operation may include outputting an immersion notification.

The control circuit 605 may determine that the electronic device 300 immerses in water when a determined impedance is out of an impedance threshold range.

The control circuit 605 may receive, from the RF circuit 620, a first feedback signal, which is an RF signal input to be provided back as feedback to the antenna 625, and a second feedback signal, which is the input RF signal to be reflected by the antenna and provided back as feedback, may determine a reflection coefficient based on a voltage of the first feedback signal and a voltage of the second feedback signal, and may determine an impedance based on the reflection coefficient.

The control circuit 605 may determine that the electronic device is immersed in water (or the water immersion of the electronic device occurs) when a resonant frequency of the antenna 625 is shifted by a threshold value or greater compared to a reference resonant frequency.

The immersion notification may include a user's action instruction.

The RF circuit 620 may include a transceiver 715 for converting an RF signal and a feedback circuit 705 through which a feedback signal is transmitted from the antenna 625 to the transceiver 715.

The feedback circuit 705 may include a coupler 710 that generates a feedback signal corresponding to an RF signal transmitted and received through the antenna 625.

The control circuit 605 may re-determine whether immersion occurs when a set time passes after executing a set operation.

The electronic device 300 according to one embodiment may further include a display 630 and an FPCB 1305 including a driving circuit of the display 630. A pull-up power line 1320 included in the FPCB 1305 is exposed, and the control circuit 650 may further compare a resistance value of the open pull-up power line 1320 with a reference resistance to determine whether the electronic device is immersed in water (or the water immersion of the electronic device occurs).

The control circuit 605 may output an immersion notification on the display 630.

An electronic device 300 according to one embodiment may include a first antenna 1130 and a second antenna 1135 for transmitting and receiving an RF signal, an RF circuit 620 for processing the RF signal, and a control circuit 605 for controlling the RF circuit 620. The control circuit 605 may determine whether the electronic device 300 is immersed in water (or the water immersion of the electronic device 300 occurs) based on the occurrence of interference between a first RF signal transmitted and received through the first antenna 1130 and a second RF signal transmitted and received through the second antenna 1135 and may perform a set operation once it is determined that the electronic device 300 is immersed in water (or the water immersion of the electronic device 300 occurs).

The control circuit 605 may receive, from the RF circuit 620, a third feedback signal, which is the first RF signal to be provided back as feedback from the first antenna 1130 to the RF circuit 620, and a fourth feedback signal, which is the second RF signal to be provided back as feedback from the second antenna 1135 to the RF circuit 620, and may compare an intensity between the third feedback signal and the fourth feedback signal to determine the occurrence of interference.

The control circuit 605 may determine that interference occurs when a ratio of an intensity of the third feedback signal to the fourth feedback signal is equal to or greater than a threshold value and may determine that the electronic device 300 immerses in water (or the water immersion of the electronic device 300 occurs) upon the occurrence of interference.

A method of recognizing the water immersion of an electronic device 300, according to one embodiment, may include receiving a feedback signal corresponding to an RF signal transmitted and received through an antenna 625 of the electronic device 300, determining an impedance of the antenna 625 based on the received feedback signal, determining whether the electronic device 300 is immersed in water (or the water immersion of the electronic device 300 occurs) based on the determined impedance, and performing a set operation once it is determined that the electronic device 300 is immersed in water (or the water immersion of the electronic device 300 occurs).

Determining whether the electronic device 300 is immersed in water (or the water immersion of the electronic device 300 occurs) based on the determined impedance may include determining that the electronic device 300 is immersed in water when the determined impedance is out of an impedance threshold range.

Receiving the feedback signal may include receiving a first feedback signal, which is an RF signal input to the antenna 625 to be provided back as feedback, and a second feedback signal, which is the input RF signal to be reflected by the antenna 625 and provided back as feedback. Determining the occurrence of immersion may include determining a reflection coefficient based on a ratio of a voltage of the first feedback signal to a voltage of the second feedback signal and determining impedance based on the reflection coefficient.

The method of recognizing the water immersion of the electronic device 300, according to one embodiment, may further include determining that the electronic device 300 is immersed in water (or the water immersion of the electronic device 300 occurs) when a resonant frequency of the antenna 625 is shifted by a threshold value or greater compared to a reference resonant frequency.

The method of recognizing the water immersion of the electronic device 300, according to one embodiment, may further include re-determining the occurrence of immersion when a set time passes after executing a set operation.

It should be understood that one embodiment of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one selected from A and B", "at least one of A or B", "A or B C", "at least one of A, B and C", "at least one selected from A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one embodiment, the module may be implemented in a form of an application-predetermined integrated circuit (ASIC).

one embodiment as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one selected from the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to one embodiment of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities, and some of the multiple entities may be separately disposed in different components. According to one embodiment, one or more of the above-described components may be omitted, or one or more other components may be added. Alternatively or additionally, a plurality of components (e.g., modules or programs) may be integrated into a single component. In such a case, according to one embodiment, the integrated component may still perform one or more functions of each of the plurality of components in the same or similar manner as they are performed by a corresponding one of the plurality of components before the integration. According to one embodiment, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    an antenna which transmits and receives a radio frequency (RF) signal;
    an RF circuit which processes the RF signal; and
    a control circuit which controls the RF circuit,
    wherein the control circuit receives, from the RF circuit, a feedback signal, which is the RF signal to be provided back as feedback from the antenna to the RF circuit, determines an impedance of the antenna based on the feedback signal, determines whether a water immersion of the electronic device occurs based on the determined impedance, and performs a set operation once it is determined that the water immersion of the electronic device occurs,
    wherein the control circuit receives, from the RF circuit, a first feedback signal, which is the RF signal input to the antenna to be provided back as feedback, and a second feedback signal, which is the input RF signal to be reflected by the antenna and provided back as feedback, determines a reflection coefficient based on a voltage of the first feedback signal and a voltage of the second feedback signal, and determines the impedance based on the reflection coefficient.

2. The electronic device of claim 1, wherein the set operation comprises outputting an immersion notification.

3. The electronic device of claim 2, wherein the control circuit determines that the water immersion of the electronic device occurs when the determined impedance is out of an impedance threshold range.

4. The electronic device of claim 1, wherein the control circuit determines that the water immersion of the electronic device occurs when a resonant frequency of the antenna is shifted by a threshold value or greater compared to a reference resonant frequency.

5. The electronic device of claim 2, wherein the immersion notification comprises a user's action instruction.

6. The electronic device of claim 1, wherein the RF circuit comprises:
    a transceiver which converts the RF signal; and
    a feedback circuit through which the feedback signal is transmitted from the antenna to the transceiver.

7. The electronic device of claim 6, wherein the feedback circuit comprises a coupler which generates the feedback signal corresponding to the RF signal transmitted and received through the antenna.

8. The electronic device of claim 1, wherein the control circuit re-determines whether the water immersion of the electronic device occurs when a set time passes after performing the set operation.

9. An electronic device comprising:
    an antenna which transmits and receives a radio frequency (RF) signal;
    an RF circuit which processes the RF signal;
    a control circuit which controls the RF circuit;
    a display; and
    a flexible printed circuit board (FPCB) comprising a driving circuit of the display,
    wherein the control circuit receives, from the RF circuit, a feedback signal, which is the RF signal to be provided back as feedback from the antenna to the RF circuit, determines an impedance of the antenna based on the feedback signal, determines whether a water immersion of the electronic device occurs based on the determined impedance, and performs a set operation once it is determined that the water immersion of the electronic device occurs,
    wherein a pull-up power line included in the FPCB is exposed and
    the control circuit compares a resistance of the exposed pull-up power line with a reference resistance to determine whether the water immersion of the electronic device occurs.

10. The electronic device of claim 9, wherein the control circuit outputs an immersion notification on the display.

11. A method of recognizing a water immersion of an electronic device, the method comprising:
    receiving a feedback signal corresponding to a radio frequency (RF) signal transmitted and received through an antenna of the electronic device,
    determining an impedance of the antenna based on the received feedback signal, determining whether the water immersion of the electronic device occurs based on the determined impedance; and performing a set operation by the electronic device once it is determined that the water immersion of the electronic device occurs, wherein the receiving the feedback signal comprises receiving a first feedback signal, which is an RF signal input to the antenna to be provided back as feedback, and a second feedback signal, which is the input RF signal to be reflected by the antenna and provided back as feedback, and wherein the determining the impedance of the antenna comprises determining a reflection coefficient based on a ratio of a voltage of the first feedback signal to a voltage of the second feedback signal and determining the impedance based on the reflection coefficient.

12. The method of claim 11, wherein the determining whether the water immersion of the electronic device occurs based on the determined impedance comprises determining that the water immersion of the electronic device occurs when the determined impedance is out of an impedance threshold range.

13. The method of claim 11, further comprising:

determining that the water immersion of the electronic device occurs when a resonant frequency of the antenna is shifted by a threshold value or greater compared to a reference resonant frequency.

14. The method of claim 11, further comprising:

re-determining whether the water immersion of the electronic device occurs when a set time passes after performing the set operation.

15. A non-transitory computer-readable medium comprising computer-readable instructions to cause a computer to perform the method of claim 11.

* * * * *